(12) United States Patent
Baker et al.

(10) Patent No.: US 9,373,948 B2
(45) Date of Patent: Jun. 21, 2016

(54) ELECTRICAL DISTRIBUTION BOARDS

(71) Applicant: SCHNEIDER ELECTRIC LIMITED, Swindon (GB)

(72) Inventors: Andrew Purdie Baker, Swindon (GB); James David Allen, Swindon (GB); Terence Edward John Lovett, Swindon (GB)

(73) Assignee: SCHNEIDER ELECTRIC LIMITED, Swindon (GB)

( * ) Notice: Subject to any disclaimer, the term of this patent is extended or adjusted under 35 U.S.C. 154(b) by 0 days.

(21) Appl. No.: 14/416,702

(22) PCT Filed: Jul. 25, 2013

(86) PCT No.: PCT/GB2013/051990
§ 371 (c)(1),
(2) Date: Jan. 23, 2015

(87) PCT Pub. No.: WO2014/016604
PCT Pub. Date: Jan. 30, 2014

(65) Prior Publication Data
US 2015/0270695 A1   Sep. 24, 2015

(30) Foreign Application Priority Data

Jul. 25, 2012  (GB) .................................. 1213236.1

(51) Int. Cl.
*H02G 5/02*      (2006.01)
*H02B 1/052*    (2006.01)
*H02B 1/20*      (2006.01)

(52) U.S. Cl.
CPC ............... *H02G 5/025* (2013.01); *H02B 1/052* (2013.01); *H02B 1/205* (2013.01)

(58) Field of Classification Search
CPC ............ H02G 5/02; H02B 1/052; H02B 1/21; H02B 1/26; H02B 1/20; H02B 5/00; H02B 1/48; G08G 1/20; H01H 9/02; H01B 5/02; H01R 4/00
USPC ......... 361/601, 605, 622, 624, 627, 630, 631, 361/634, 636, 637, 638, 639, 641, 646, 647, 361/650, 652, 656, 673; 174/66, 67, 68.2, 174/148, 149 B, 133 B, 171, 129 B, 88 B, 174/218.2, 43, 157; 200/331, 293, 306, 200/43.15, 48 R, 294, 296; 218/7, 43, 157; 439/212, 709, 922, 810
See application file for complete search history.

(56) References Cited

U.S. PATENT DOCUMENTS 3,267,336 A * 8/1966 Kussy ...................... H02B 1/21
                                                                    361/650
5,032,092 A    7/1991 Linn
(Continued)

FOREIGN PATENT DOCUMENTS

EP    0788205 A2   8/1997
GB    2007434 A    5/1979
(Continued)

OTHER PUBLICATIONS

Starck, Thierry, "International Search Report," prepared for PCT/GB2013/051990, as mailed Oct. 7, 2013, five pages.

*Primary Examiner* — Michail V Datskovskiy
(74) *Attorney, Agent, or Firm* — Winstead PC

(57) ABSTRACT

The present invention relates to an electrical distribution board. The electrical distribution board comprises at least one incoming conductor terminal, at least one outgoing conductor terminal, at least one longitudinal bus conductor connected to the at least one incoming conductor terminal, at least one lateral conductor tab connected to the at least one bus conductor for distributing electrical power from the at least one bus conductor to the at least one outgoing conductor terminal, and at least one isolation mechanism for electrically isolating the at least one outgoing conductor terminal from the at least one lateral conductor tab. The at least one isolation mechanism is moveable between a first position in which the at least one outgoing conductor terminal is electrically isolated from the at least one lateral conductor tab and a second position in which the at least one outgoing conductor terminal is electrically connected to the at least one lateral conductor tab. The at least one isolation mechanism is configured to be engageable with a housing of the electrical distribution board when the at least one isolation mechanism is in the first position, such that movement of the at least one isolation mechanism from the first position to the second position is only possible once the at least one isolation mechanism has been disengaged from the housing of the electrical distribution board.

14 Claims, 12 Drawing Sheets

(56) References Cited

U.S. PATENT DOCUMENTS

| | | | | |
|---|---|---|---|---|
| 5,933,319 A | * | 8/1999 | Buckner | H02B 1/056 200/50.22 |
| 7,298,606 B2 | * | 11/2007 | M'Sadoques | H02B 1/056 361/634 |
| 7,616,424 B2 | * | 11/2009 | Hansen | H02H 3/22 361/111 |
| 7,692,112 B2 | * | 4/2010 | Deboer | H01H 89/06 200/331 |
| 8,624,758 B2 | * | 1/2014 | Ingram | G08G 1/20 340/995.1 |
| 8,711,547 B2 | * | 4/2014 | Marzano | H01H 71/082 174/117 F |
| 2007/0158171 A1 | * | 7/2007 | Deboer | H01H 89/06 200/331 |

FOREIGN PATENT DOCUMENTS

| | | | | |
|---|---|---|---|---|
| GB | 2230901 A | | 10/1990 | |
| GB | 2461616 A | * | 1/2010 | H01H 9/283 |
| GB | 2475144 A | | 5/2011 | |
| GB | 2498019 A | | 7/2013 | |

* cited by examiner

ELECTRICAL DISTRIBUTION BOARDS

The present invention relates to an electrical distribution board.

An electrical distribution board distributes electrical power from one or more incoming power supply terminals to a number of outgoing power supply terminals. Typically, the electrical distribution board comprises one or more bus conductors which run the length of the board. The bus conductors carry the incoming electrical power to one or more outgoing "stab" conductors which are, in turn, connected to one or more circuit breakers of the outgoing circuit.

In the case where the bus conductors of the electrical distribution board are connected directly to the stab conductors, when work is required to be carried out on one or more of the outgoing circuits the circuit breakers are used to break the electrical connection between the stab conductors and the outgoing circuit. Then, in order to prevent the circuit breakers from being accidentally reconnected, a plastic cover, which may be lockable, or electrical insulation tape is placed over the circuit breaker switch. Alternatively, and more properly, the circuit breaker is removed from the distribution board and a blanking module is used to cover the stab conductor. Once the work is complete the plastic cover or the tape or blanking module are removed and the outgoing circuit reconnected. The tape technique is not recommended or officially sanctioned, but often happens in practice.

In addition to an MCB, or the like, being provided between the stab conductor and the outgoing circuit, the electrical distribution board may additionally include an isolation switch positioned between the bus conductor and the stab conductor. Schneider Electric in particular supplies "Isobar" brand of boards with this feature. The purpose of the isolation switch is to allow unused stab conductors to be electrically isolated from the bus conductor. The isolation switches are located within an insulated housing block which at least partially shrouds the stab conductors, the isolation switches and the bus conductors. The housing block, stab conductors, isolation switches and bus conductors are mounted upon a mounting plate to which the circuit breakers are latched. The mounting plate is secured inside a standard cabinet, or the like. This facility is not designed to prevent electric shock when work is required to be carried out on the outgoing circuit, but is sometimes used by workers for that purpose.

With these known precautions, there remains a risk of electrocution by virtue of the fact that the outgoing circuit could be prematurely re-energised either by someone accidentally operating the isolation switch, or the circuit breaker switch (for example by pressing against the switch through the insulating tape, or when the tape falls off prematurely). Someone may remove the cover or blanking module and operate the switch on the assumption that the work had been completed. Where different electricians are working on different circuits, one may accidentally reenergise the wrong circuit when he has completed his own work.

According to a first aspect of the present invention there is provided an electrical distribution board comprising:
  at least one incoming conductor terminal;
  at least one outgoing conductor terminal;
  at least one longitudinal bus conductor connected to the at least one incoming conductor terminal;
  at least one lateral conductor tab connected to the at least one bus conductor for distributing electrical power from the at least one bus conductor to the at least one outgoing conductor terminal; and
  at least one isolation mechanism for electrically isolating the at least one outgoing conductor terminal from the at least one lateral conductor tab, the at least one isolation mechanism being moveable between a first position in which the at least one outgoing conductor terminal is electrically isolated from the at least one lateral conductor tab and a second position in which the at least one outgoing conductor terminal is electrically connected to the at least one lateral conductor tab,
  wherein the at least one isolation mechanism is configured to be engageable with a housing of the electrical distribution board when the at least one isolation mechanism is in the first position, such that movement of the at least one isolation mechanism from the first position to the second position is only possible once the at least one isolation mechanism has been disengaged from the housing of the electrical distribution board.

The at least one isolation mechanism may also be configured to be engageable with a housing of the electrical distribution board when the at least one isolation mechanism is in the second position such that movement of the at least one isolation mechanism from the second position to the first position is only permitted once the at least one isolation mechanism has been disengaged from the housing of the electrical distribution board.

The housing of the electrical distribution board may house the at least one lateral conductor tab, the at least one outgoing conductor terminal and the at least one isolation mechanism. The housing may be electrically insulating. The at least one outgoing conductor terminal may at least partially protrude from the housing.

The at least one isolation mechanism may be arranged such that it is moveable substantially within the housing of the electrical distribution board. The at least one isolation mechanism may be arranged to slidably move between the first position and the second position within the housing of the electrical distribution board. That is the at least one isolation mechanism may be arranged to slide relative to the housing of the electrical distribution board between the first position and the second position.

The at least one isolation mechanism may include a body portion. The body portion may house an electrical connector for connecting the at least one outgoing conductor terminal to the at least one lateral conductor tab. The electrical connector is arranged to move with the at least one isolation mechanism between the first and second positions.

When the at least one isolation mechanism is in the first position, the electrical connector may be in electrical contact with the at least one lateral conductor tab and out of electrical contact with the at least one outgoing conductor terminal. When the at least one isolation mechanism is in the second position, the electrical connector may be in electrical contact with both the at least one outgoing conductor terminal and the at least one lateral conductor tab.

The at least one isolation mechanism may be a slide operated switch. The at least one isolation mechanism may be a mechanical switch.

The body portion of the at least one isolation mechanism may include at least one engagement portion. The body portion of the at least one isolation mechanism may include a first engagement portion and a second engagement portion.

The first engagement portion of the at least one isolation mechanism may be configured to engage with an at least partially complimentary shaped engagement portion of the housing of the electrical distribution board. The first engagement portions of the at least one isolation mechanism and the housing of the electrical distribution board being arranged such that the at least one isolation mechanism and the housing of the electrical distribution board are engageable with one another, such that movement of the at least one isolation mechanism from the first position to the second position is only possible once the at least one isolation mechanism has been disengaged from the housing of the electrical distribution board.

The second engagement portion of the at least one isolation mechanism may be configured to engage with a complimentary shaped engagement portion of the housing of the electrical distribution board. The second engagement portions of the at least one isolation mechanism and the housing of the electrical distribution board being arranged such that the at least one isolation mechanism and the housing of the electrical distribution board are engageable with one another, such that movement of the at least one isolation mechanism from the second position to the first position is only possible once the at least one isolation mechanism has been disengaged from the housing of the electrical distribution board.

The engagement portions of the body portion of the at least one isolation mechanism may include one or more recessed portions and the engagement portion of the housing of the electrical distribution board may include one or more correspondingly shaped protruding portions. The recessed portions being configured to receive the correspondingly shaped protruding portions therein. Alternatively, the engagement portions of the body portion of the at least one isolation mechanism may include one or more protruding portions and the engagement portion of the housing of the electrical distribution board may include one or more correspondingly shaped recessed portions.

At least part of the body portion of the at least one isolation mechanism may be resilient. The body portion of the at least one isolation mechanism may be made from a resilient material.

The body portion of the at least one isolation mechanism may be sufficiently resilient that, when the at least one isolation mechanism is engaged with the housing of the electrical distribution board in the first position, or the second position, the at least one isolation mechanism may be disengaged from the housing of the electrical distribution board by at least partially deforming the body portion of the least one isolation mechanism. That is, the at least one isolation mechanism may be disengaged from the housing of the electrical distribution board by at least partially and temporarily altering the physical shape of the body portion of the least one isolation mechanism. When the engagement portions of the body portion of the at least one isolation mechanism includes one or more recessed portions and the engagement portion of the housing of the electrical distribution board includes one or more correspondingly shaped protruding portions, the one or more recessed portions and the one or more protruding portions are separated by the deformation of the body portion of the at least one isolation mechanism. When the at least one isolation mechanism is disengaged from the housing of the electrical distribution board the at least one isolation mechanism may be moved between the first and second positions.

The body portion of the at least one isolation mechanism may be disengaged from the housing of the electrical distribution board by hand.

The engagement portions of the body portion of the at least one isolation mechanism and the housing of the electrical distribution board may include a chamfered portion. The chamfered portion assists in the movement of the at least one isolation mechanism between the first and second positions. The chamfered portion is positioned adjacent one side of each engagement portion.

The body portion of the at least one isolation mechanism may include a planar member which protrudes therefrom.

The body portion of the at least one isolation mechanism and the housing of the electrical distribution board may be arranged such that the body portion of the at least one isolation mechanism is located within the housing of the electrical distribution board and the planar member protrudes from the housing of the electrical distribution board.

The planar member may have a top surface with is substantially flush with a top surface of the housing of the electrical distribution board when the at least one isolation mechanism is in the first position.

The planar member may have a distal end which protrudes from a side of the housing of the electrical distribution board when the at least one isolation mechanism is in the first position.

The planar member may be formed integrally with the body portion. The planar member may be resilient. The planar member may resiliently deform with respect to the body portion.

The body portion may be formed from polycarbonate. The body portion and planar member may be formed from polycarbonate.

The planar member of the body portion of the at least one isolation mechanism may include the at least one engagement portion. The planar member of the body portion of the at least one isolation mechanism may include the first and second engagement portions. The first engagement portion may be located towards a distal end of the planar member. The second engagement portion may be located inwards of the first engagement portion.

The planar member of the body portion of the at least one isolation mechanism may include the one or more recessed portions of the first and second engagement portions.

The housing of the electrical distribution board may include a wall portion. The wall portion may include the engagement portion. The wall portion of the housing of the electrical distribution board may include the one or more protruding portions. The engagement portion of the housing of the electrical distribution board may be configured to engage with the first and second engagement portions of the planar member of the at least one isolation mechanism.

Alternatively, the planar member of the body portion of the at least one isolation mechanism may include the one or more protruding portions and the wall portion of the housing of the electrical distribution board may include the one or more recessed portions.

The planar member of the body portion of the at least one isolation mechanism may be sufficiently resilient that, when the at least one isolation mechanism is engaged with the housing of the electrical distribution board in the first position, or the second position, the at least one isolation mechanism may be disengaged from the housing of the electrical distribution board by at least partially deforming the planar member of the body portion of the least one isolation mechanism. That is, the at least one isolation mechanism may be disengaged from the housing of the electrical distribution board by at least partially and temporarily altering the physical shape of the planar member of the body portion of the least one isolation mechanism. When the engagement portion of the planar member of the body portion of the at least one isolation mechanism includes one or more recessed portions and the engagement portion of the housing of the electrical distribution board includes one or more correspondingly shaped protruding portions, the one or more recessed portions and the one or more protruding portions are separated by the deformation of the planar member of the body portion of the at least one isolation mechanism. When the at least one isolation mechanism is disengaged from the housing of the electrical distribution board the at least one isolation mechanism may be moved between the first and second positions.

The at least one bus conductor may have a longitudinal axis and the at least one lateral conductor tab may be arranged such that the longitudinal axis of the at least one lateral conductor tab is substantially orthogonal to the longitudinal axis of the at least one bus conductor.

The electrical distribution board may further comprise an attachment plate. The housing of the electrical distribution board may be detachably mounted to the attachment plate.

The attachment plate may comprise one side of an outgoing component mounting rail. The rail may be a DIN rail. The outgoing component in this case may be a circuit breaker.

The body portion of the at least one isolation mechanism may cover at least a part of an upper surface of a circuit breaker when the at least one isolation mechanism is in the second position and the circuit breaker is attached to the outgoing component mounting rail. The body portion of the at least one isolation mechanism may cover a circuit breaker attachment portion when the at least one isolation mechanism is in the second position and the circuit breaker is attached to the outgoing component mounting rail.

The planar member of the body portion of the at least one isolation mechanism may cover at least a part of an upper surface of a circuit breaker when the at least one isolation mechanism is in the second position and the circuit breaker is attached to the outgoing component mounting rail. The planar member of the body portion of the at least one isolation mechanism may cover a circuit breaker attachment portion when the at least one isolation mechanism is in the second position and the circuit breaker is attached to the outgoing component mounting rail.

The electrical distribution board may comprise a plurality of incoming conductor terminals. The electrical distribution board may comprise three incoming conductor terminals.

The electrical distribution board may comprise a plurality of outgoing conductor terminals.

The electrical distribution board may comprise a plurality of longitudinal bus conductors. The electrical distribution board may comprise three longitudinal bus conductors. Each bus conductor may be connected to an incoming conductor terminal.

The electrical distribution board may comprise a plurality of lateral conductor tabs. Each lateral conductor tab being connected to a bus conductor for distributing electrical power from the bus conductor to an outgoing conductor terminal.

The electrical distribution board may comprise a plurality of isolation mechanisms. Each isolation mechanism for electrically isolating an outgoing conductor terminal from a lateral conductor tab, the isolation mechanism being moveable between a first position in which the outgoing conductor terminal is electrically isolated from the lateral conductor tab and a second position in which the outgoing conductor terminal is electrically connected to the lateral conductor tab.

The outgoing conductor terminals may be located on opposite sides of the housing of the electrical distribution board.

The at least one isolation mechanism may further include a visual indication device to indicate if the isolation mechanism is in the first position or the second position.

The at least one isolation mechanism may translate between the first position and the second position. The at least one isolation mechanism may move laterally with respect to the at least one bus conductor.

The electrical distribution board may further comprise at least on outgoing circuit component. The outgoing circuit component may be a circuit breaker.

The electrical distribution board may comprise a base assembly comprising a mounting plate that supports the bus conductors and the lateral tabs. The mounting plate may provide mounting points for one or more circuit breakers of the outgoing circuit. The mounting plate may comprise one side of an outgoing component mounting rail. The rail may be a DIN rail. The outgoing component in this case may be a circuit breaker.

The electrical distribution board may further comprise an incoming supply base module. The incoming supply base module provides support for the associated wiring of the electrical distribution board.

An embodiment of the present invention will now be described, by way of example only, with reference to the accompanying drawings, in which:—

Figure 1:
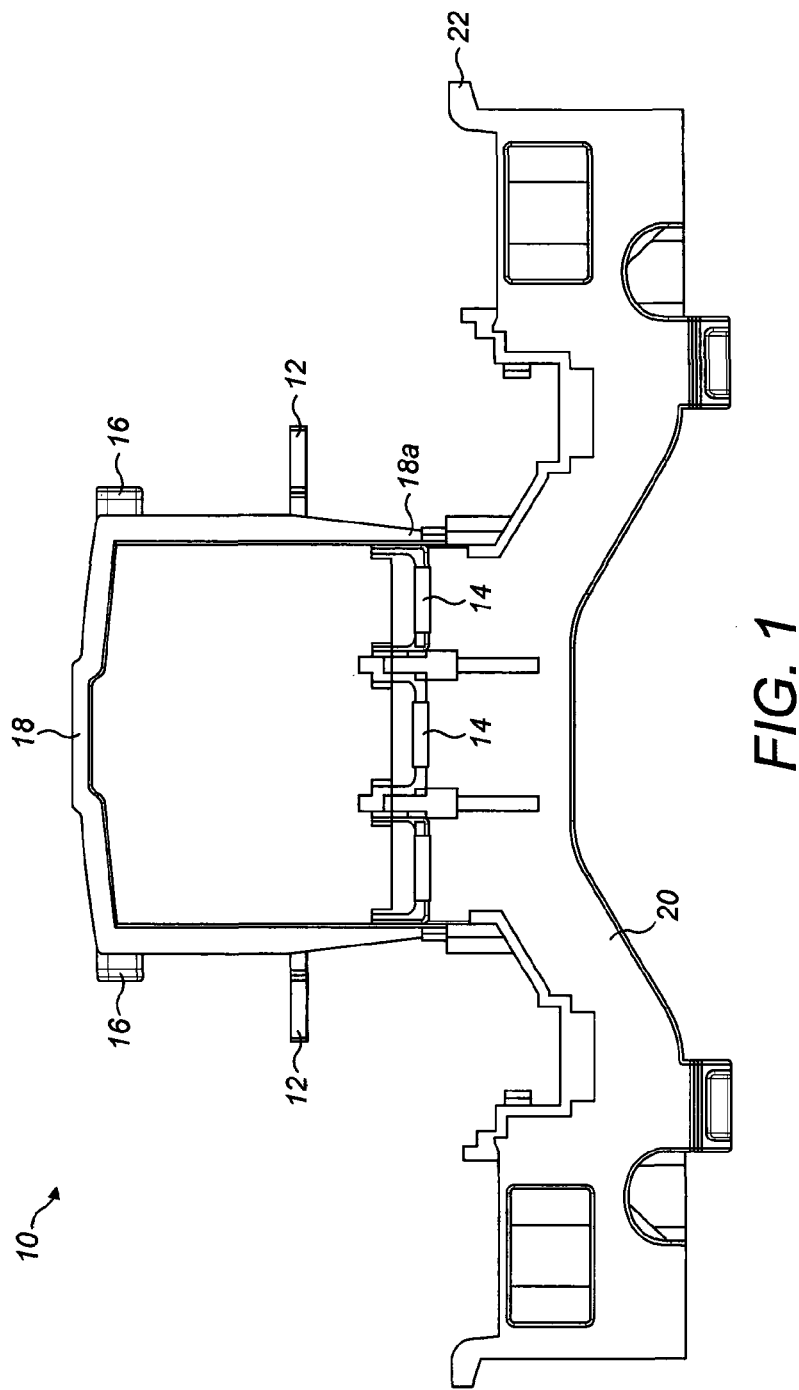
FIG. 1 is a side view of an electrical distribution board according to the present invention.
Figure 2:
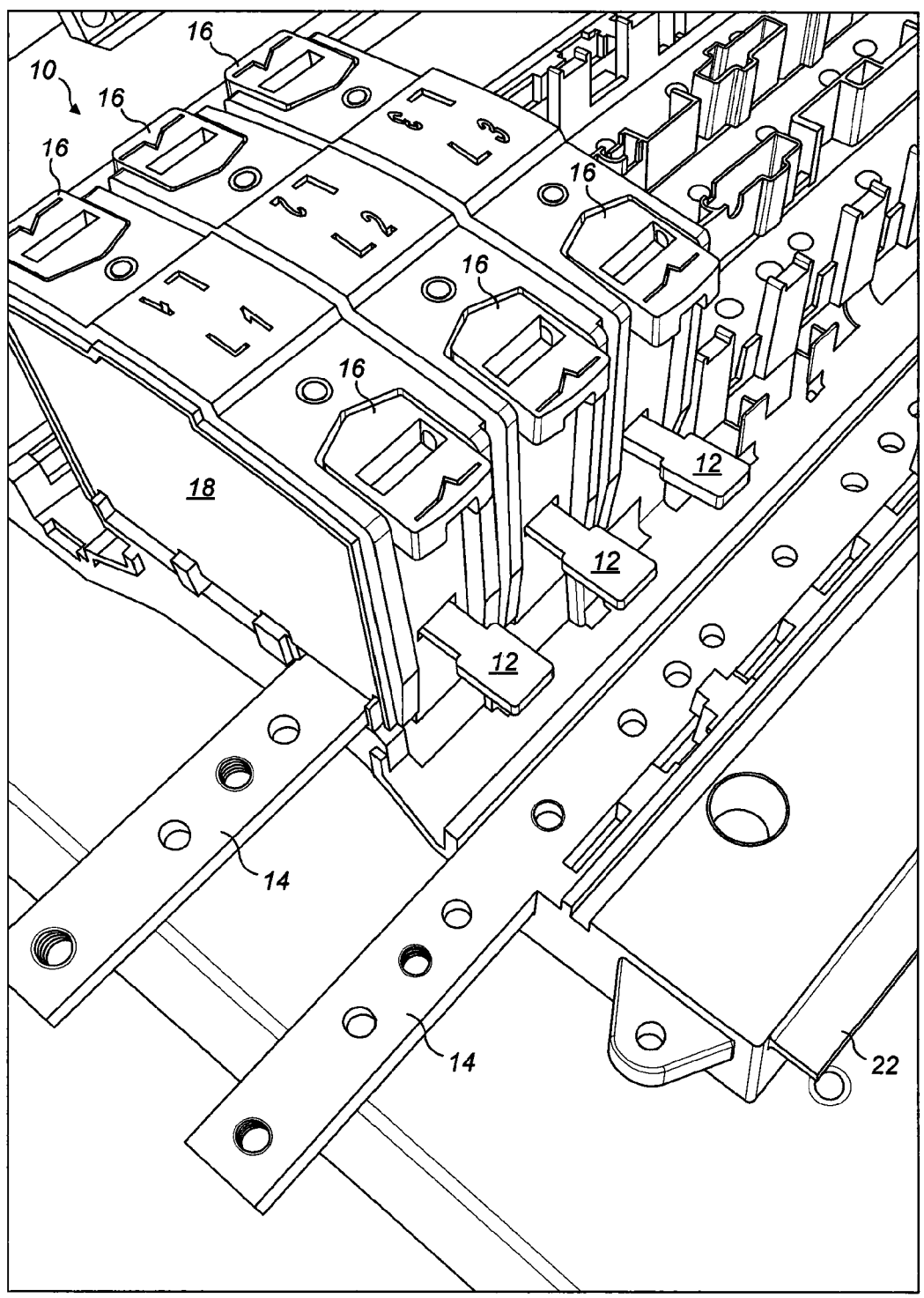
FIGS. 2 and 3 are perspective views of the electrical distribution board of FIG. 1.

FIG. 1 illustrates an electrical distribution board 10. The electrical distribution board 10 comprises a plurality of incoming conductor terminals (not shown), a plurality of outgoing conductor terminals 12, a set of longitudinal bus conductors 14, a plurality of lateral conductor tabs 15 (see FIG. 5) and a plurality of isolation mechanisms 16.

The bus conductors 14 are connected to the incoming conductor terminals. The incoming terminals are, in the embodiment illustrated here, connected to a three-phase incoming power supply. The bus conductors 14 have longitudinal axes.

Figure 5:
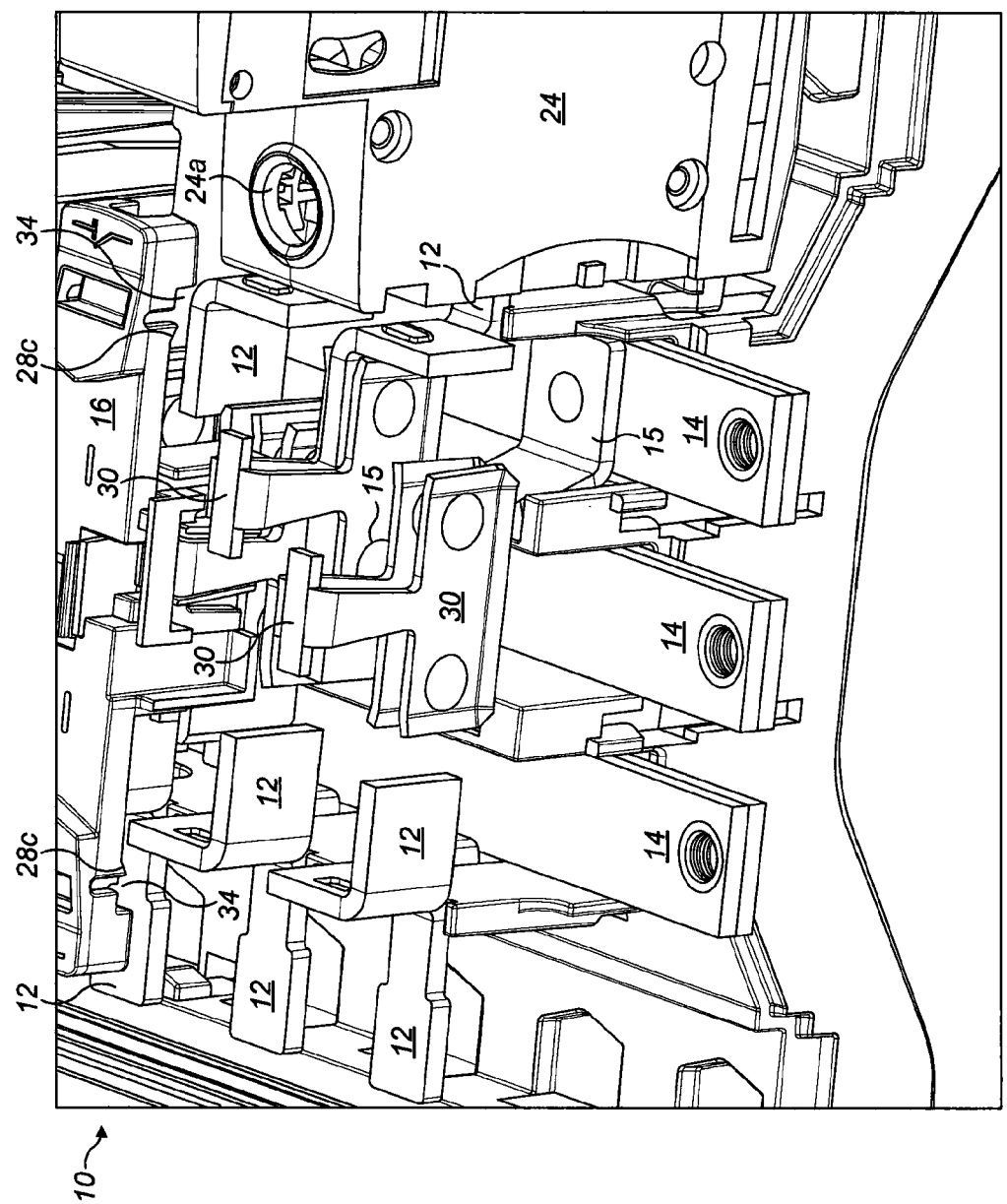

As illustrated in FIG. 5, the lateral conductor tabs 15 are connected to the bus conductors 14 and are for distributing electrical power from the bus conductors 14 to the outgoing conductor terminals 12. The lateral conductor tabs 15 are selectively connected to only one bus conductor 14 for the transfer of electrical power to only one outgoing conductor terminal 12. The lateral conductor tabs 15 are arranged such that the longitudinal axes of the bus conductors 14 are substantially perpendicular to the longitudinal axes of the lateral bus conductors 15.

Figure 4:
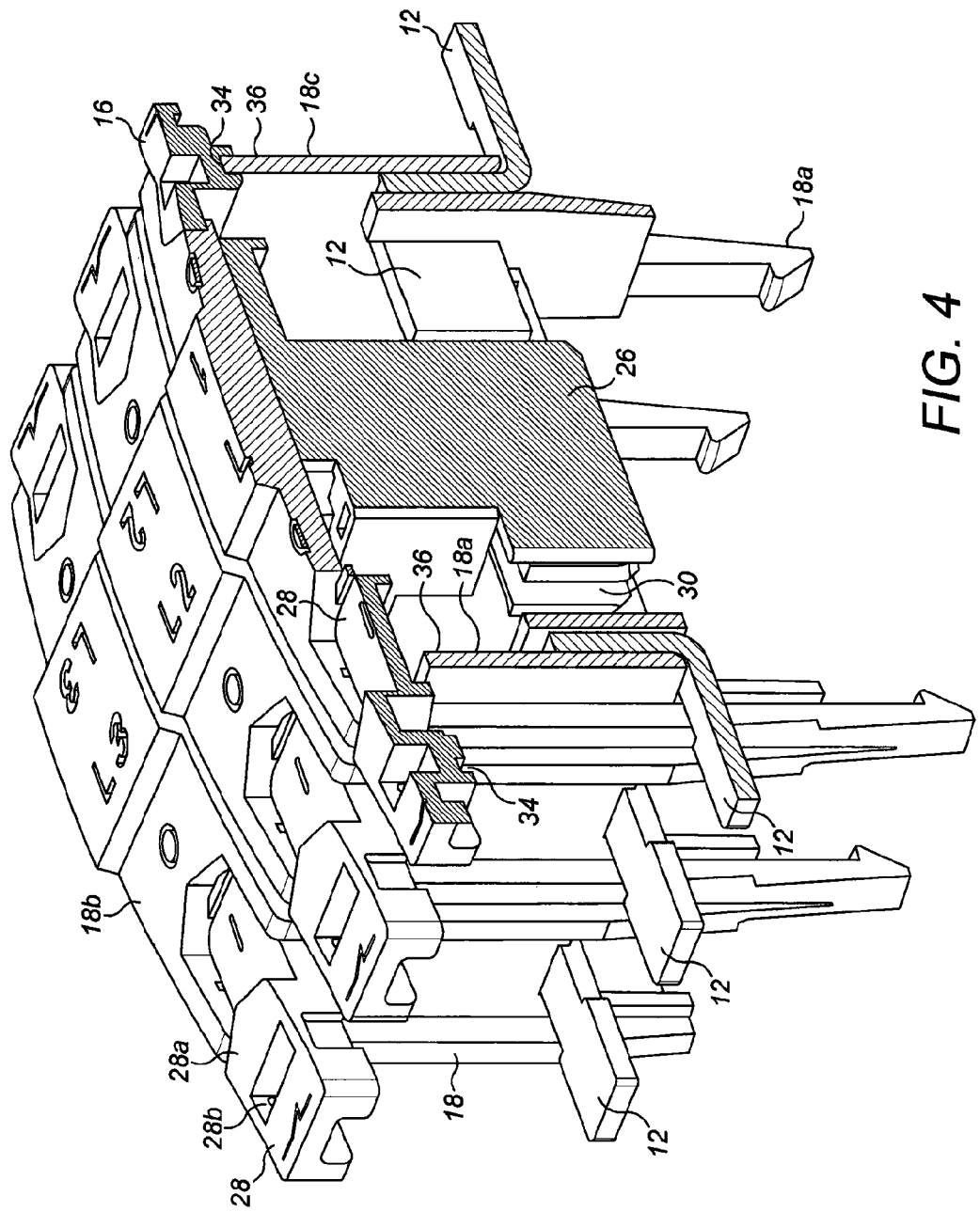
FIGS. 4 and 5 are partial cut out views of FIG. 3.

The electrical distribution board 10 includes a housing 18. With reference to FIGS. 1 and 4 in particular, the housing 18 houses the lateral conductor tabs 15, the outgoing conductor terminals 12 (at least partially) and the isolation mechanisms 16. The outgoing conductor terminals 12 protrude from the housing 18. The housing 18 is electrically insulated.

The electrical distribution board 10 further comprises an attachment plate 20. The housing 18 of the electrical distribution board is detachably mounted to the attachment plate 20 via resilient connection members 18a. The housing 18 is removably attachable to the attachment plate 20 by engaging and disengaging the connection members 18a with the attachment plate 20. The attachment plate 20 includes an outgoing component mounting rail 22. The rail may be a DIN rail. The outgoing component in this case may be a circuit breaker 24, as illustrated in FIGS. 9 to 12 and described further below. The attachment plate 20 (and housing 18) is typically fitted inside a wall unit, or the like.

Figure 8:
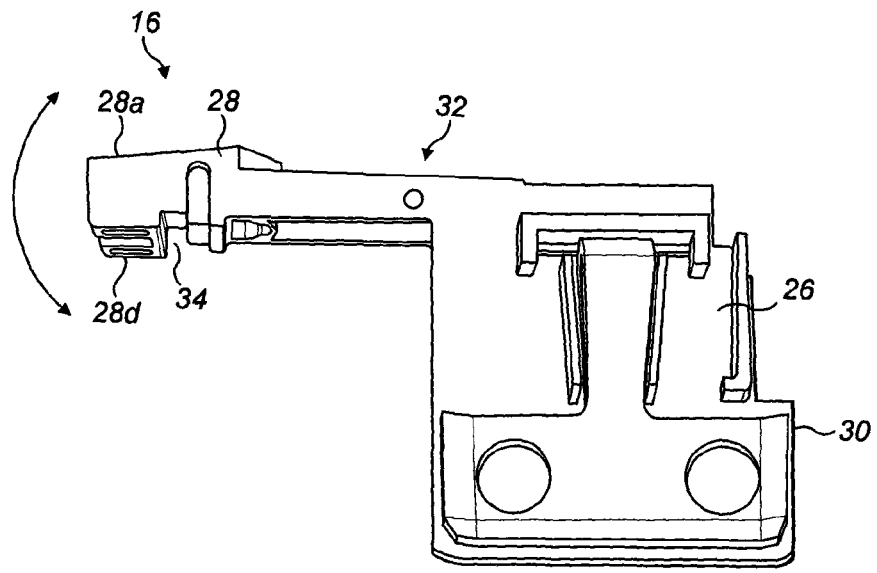
FIG. 8 is a side view of the isolation mechanism of the electrical distribution board.
Figure 9:
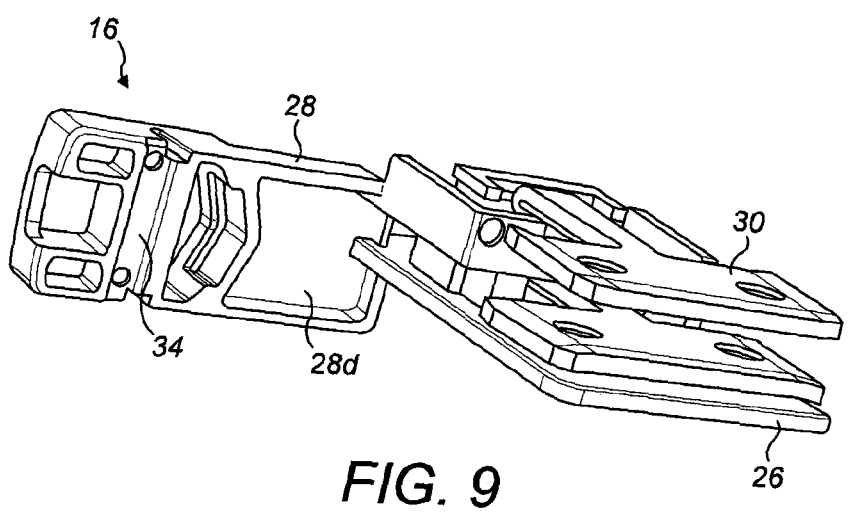
FIG. 9 is a perspective view of the isolation mechanism of FIG. 8.

The isolation mechanisms 16 are for electrically isolating the outgoing conductor terminals 12 from the lateral conductor tabs 15 (and bus conductors 14). As illustrated in FIGS. 4, 5, 8 and 9, each isolation mechanism 16 includes a body portion 26. The body portion 26 is made from polycarbonate, although it should be appreciated that the body portion 26 could be made from any other suitable material. The body portion 26 includes a planar member 28 which protrudes therefrom. The planar member 28 functions as a hand operated switch and provides a hand contact point for operation of the isolation mechanism 16. The planar member 28 is integrally formed with the body portion 26. The planar member 28 is resilient. That is, the planar member 28 may resiliently deform with respect to the body portion 26 of the isolation mechanism. With reference to FIG. 8, the planar member 28 is configured to move in the directions of the arrows, as indicated. That is, the planar member 28 may bend around a general point 32. The bending action of the planar member 28 is a result of the material of construction of the body portion 26 (and planar member 28) and the configuration (size, thickness and width, physical properties) of the planar member 28 and body portion 26.

The body portion 26 of the isolation mechanism 16 houses an electrical connector 30 for connecting the outgoing conductor terminal 12 to the lateral conductor tab 15 (see below).

As best illustrated in FIG. 4, the housing 18 houses the isolation mechanism 16 therein, with the planar member 28 protruding from a top/side wall 18b, 18c thereof. The planar member 28 has a top surface 28a which is substantially flush with the top surface 18b of the housing 18.

The isolation mechanism 16 (body portion 26, planar member 28 and electrical connector 30) are arranged such they are slidably moveable within the housing 18.

Figure 3:
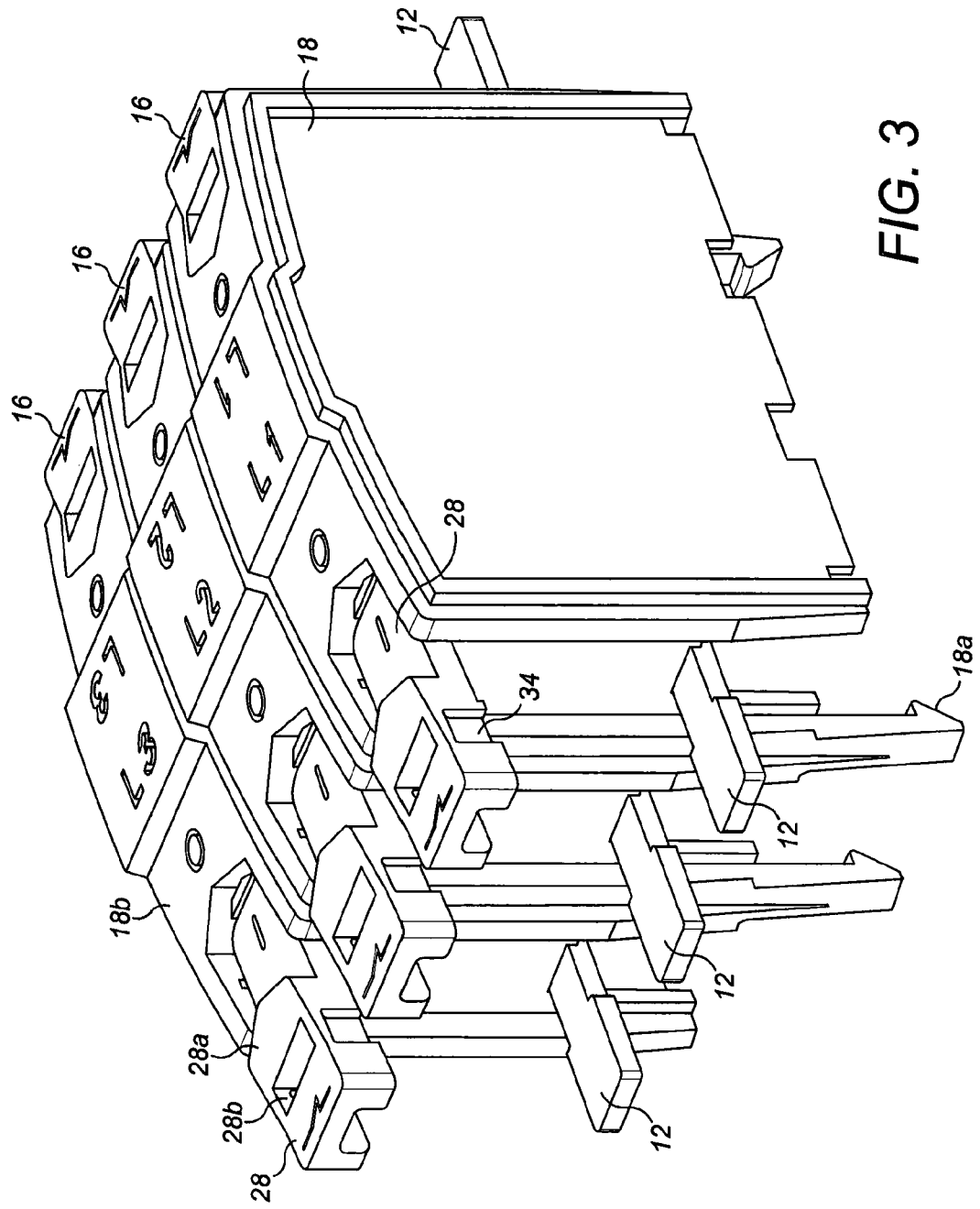

With particular reference to FIG. 5, the isolation mechanisms 16 are moveable between a first position ("Off", "0") in which the outgoing conductor terminal 12 is electrically isolated from the lateral conductor tab 15 and a second position ("On", "I") in which the outgoing conductor terminal 12 is electrically connected to the lateral conductor tab 15. When the isolation mechanism 16 is in the first position ("Off", "0"), the electrical connector 30 is in electrical contact with the lateral conductor tab 15 and out of contact with the outgoing conductor terminal 12. When the isolation mechanism 16 is in the second position ("On", "I"), the electrical connector 30 is in electrical contact with both the lateral conductor tab 15 and the outgoing conductor terminal 12. As illustrated in FIGS. 3 to 5, the isolation mechanisms 16 are arranged to slidably move between the first position ("Off", "0") and the second position ("On", "I") within the housing 18.

As best illustrated in FIGS. 3 to 9, the body portion 26 of the isolation mechanism 16 includes an engagement portion 34 and the housing 18 includes a complimentary shaped engagement portion 36. More specifically, the planar member 28 of the body portion 26 of the isolation mechanism 16 includes an engagement portion 34 and the side wall 18c of the housing includes the shaped engagement portion 36.

In the embodiment illustrated and described here the engagement portion 34 of the isolation mechanism 16 is in the form of a recessed portion and the engagement portion 36 of the housing is in the form of a protruding portion. The recessed portion being configured to receive at least a part of the protruding portion therein, as illustrated in FIG. 6.

Figure 6:
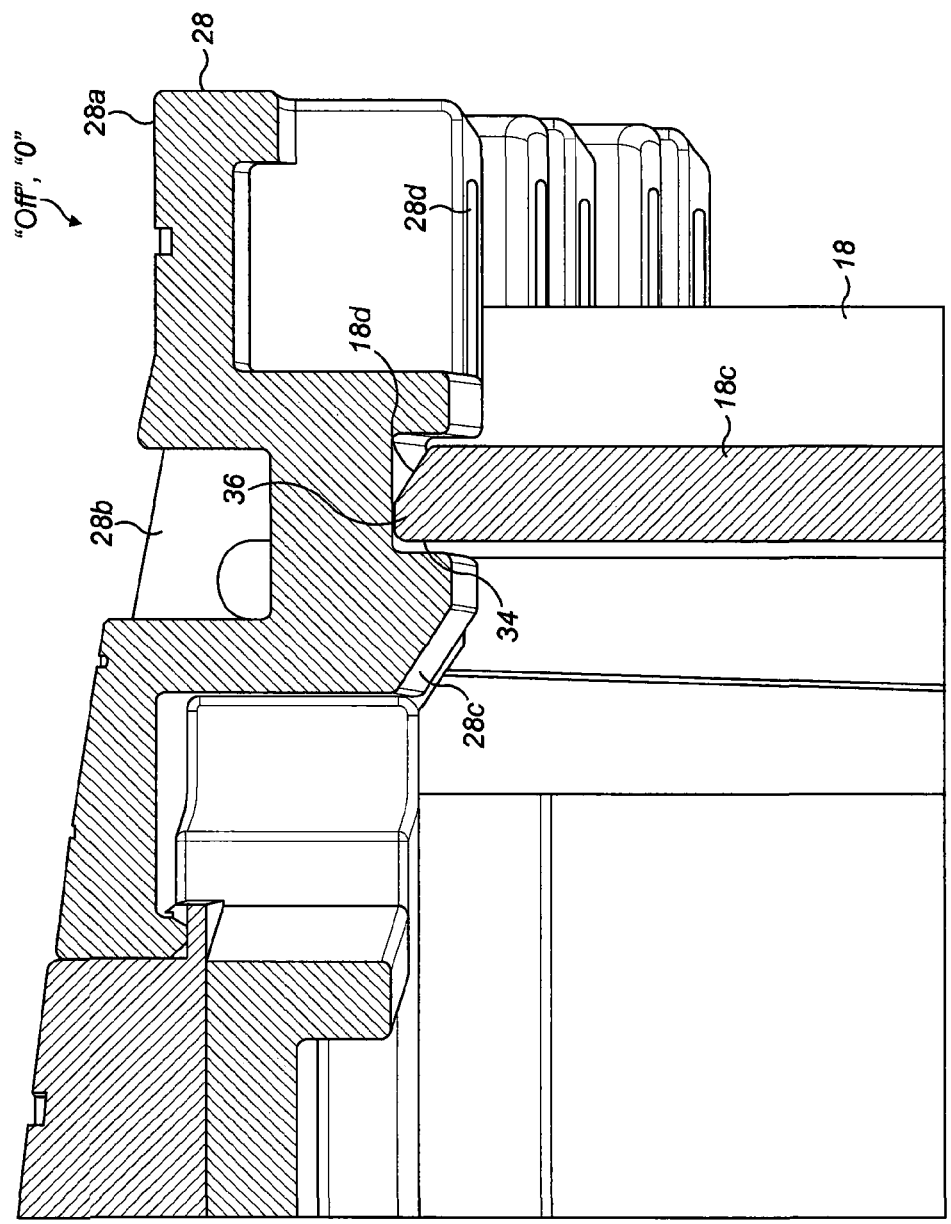
FIG. 6 is a partial side view of an isolation mechanism of the electrical distribution board in the first position.

As illustrated in FIG. 6, the isolation mechanism 16 is configured to be engageable with the housing 18 when the isolation mechanism 16 is in the first position ("Off", "0"), such that movement of the isolation mechanism 16 to the second position ("On", "I") is only possible by disengaging the isolation mechanism 16 from the housing 18. As illustrated in FIG. 6, due to the engagement between the engagement portions 34 and 36 of the planar member 34 and the housing 18, it is not possible to slide the planar member 28 from the first position ("Off", "0") to the second position ("On", "I").

As describe above, the planar member 28 of the body portion 26 of the isolation mechanism 16 is sufficiently resilient that, when the isolation mechanism 16 is engaged with the housing 18 of the electrical distribution board 10 in the first position ("Off", "0"), the isolation mechanism 16 may be disengaged from the housing 18 by at least partially deforming the planar member 28. That is, the isolation mechanism 16 may be disengaged from the housing 18 by at least partially and temporarily altering the physical shape of the planar member 28. When the engagement portion 34 of the planar member 28 includes one or more recessed portions and the engagement portion 36 of the housing 18 includes one or more protruding portions, the one or more recessed portions and the one or more protruding portions are separated by the deformation of the planar member 28. When the one or more recessed portions and the one or more protruding portions are separated by the deformation of the planar member 28 the isolation mechanism 16 may be moved (slid) from the first position ("Off", "0") to the second position ("On", "I"). The operation of the isolation mechanism 16 may be performed by hand. The planar member 28 includes a further recessed portion 28b on its top surface 28a to facilitate operation thereof with, for example, a finger. When the isolation mechanism 16 is disengaged from the housing 18, the isolation mechanism 16 may be moved between the first and second positions ("Off", "0"), ("On", "I").

Figure 7:
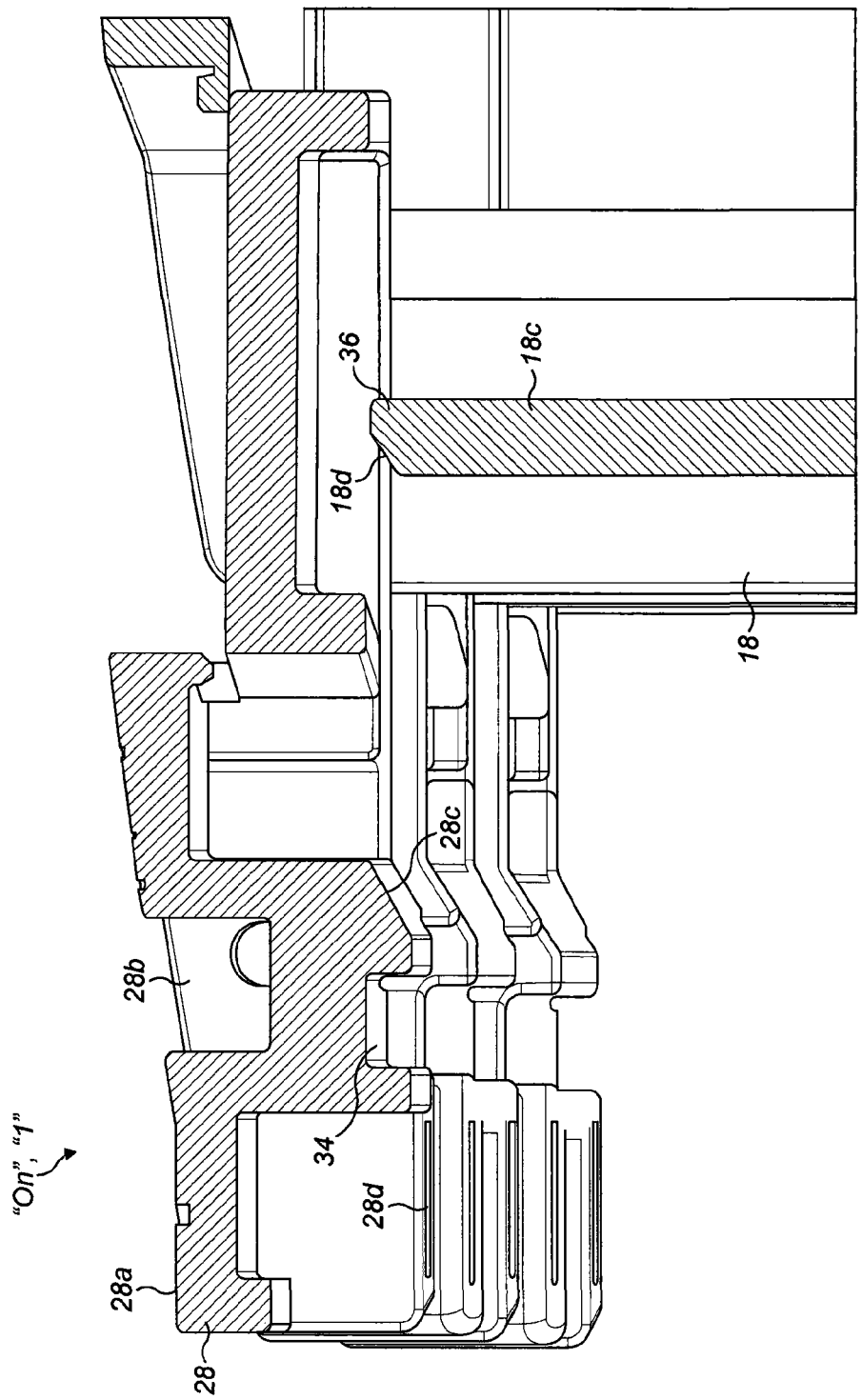
FIG. 7 is a partial side view of an isolation mechanism of the electrical distribution board in the second position.

The isolation mechanism 16 may be reengaged with the housing 18 by moving (sliding) the planar member 28 from the second position ("On", "I") to the first position ("Off", "0"). This is performed by pushing the planar member 28 back towards the housing 18. As best illustrated in FIGS. 6 and 7, the planar member 28 and the housing 18 include chamfered portions 28c, 18d which facilitate reengagement of the engagement portions 34, 36.

The housing 18 and the isolation mechanisms 16 include visual indicators ("0", "I") to indicate the position of the isolation mechanism 16.

Figure 10:
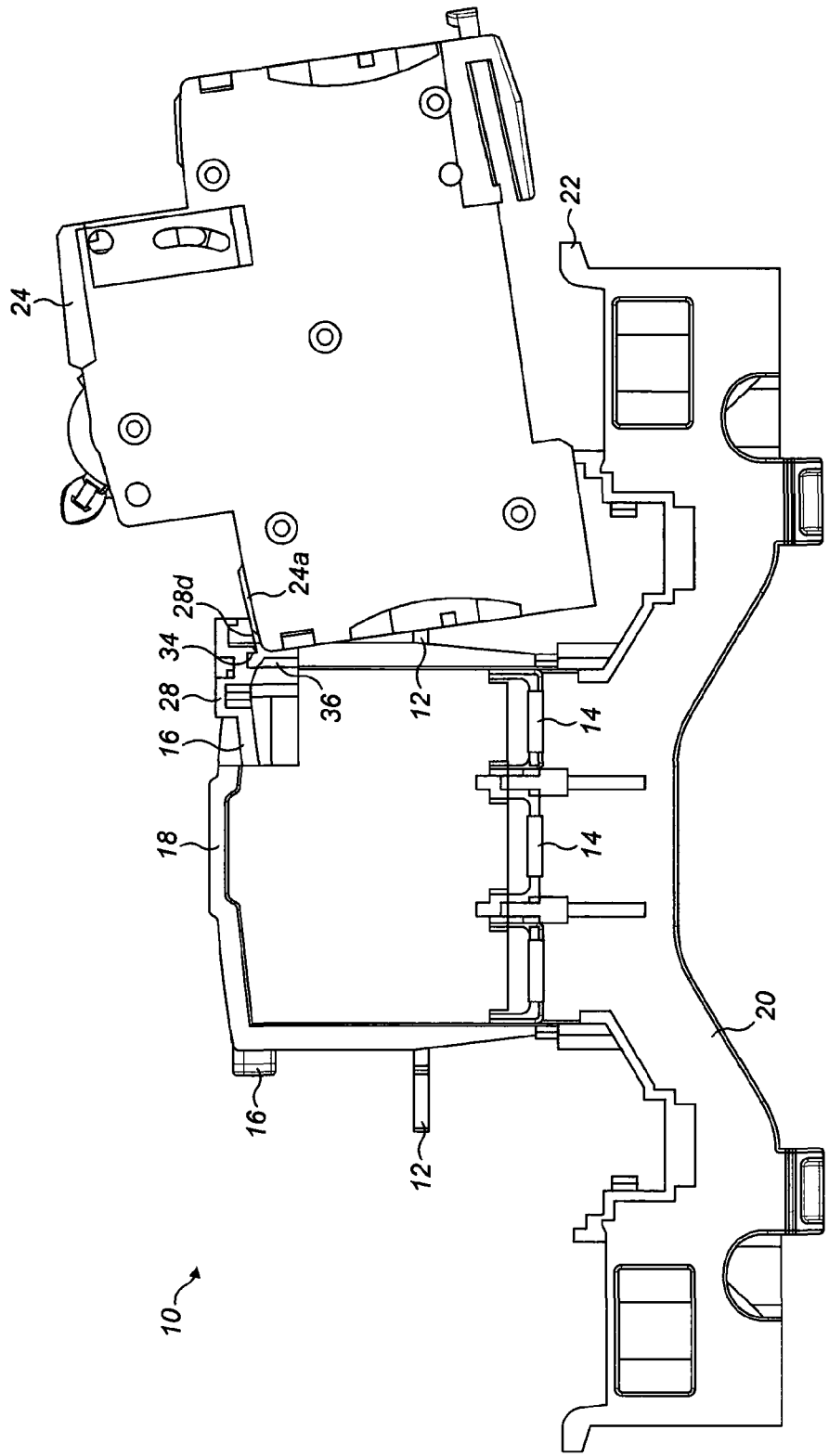
FIG. 10 is an in-use side view of the electrical distribution board with a circuit breaker being attached.
Figure 11:
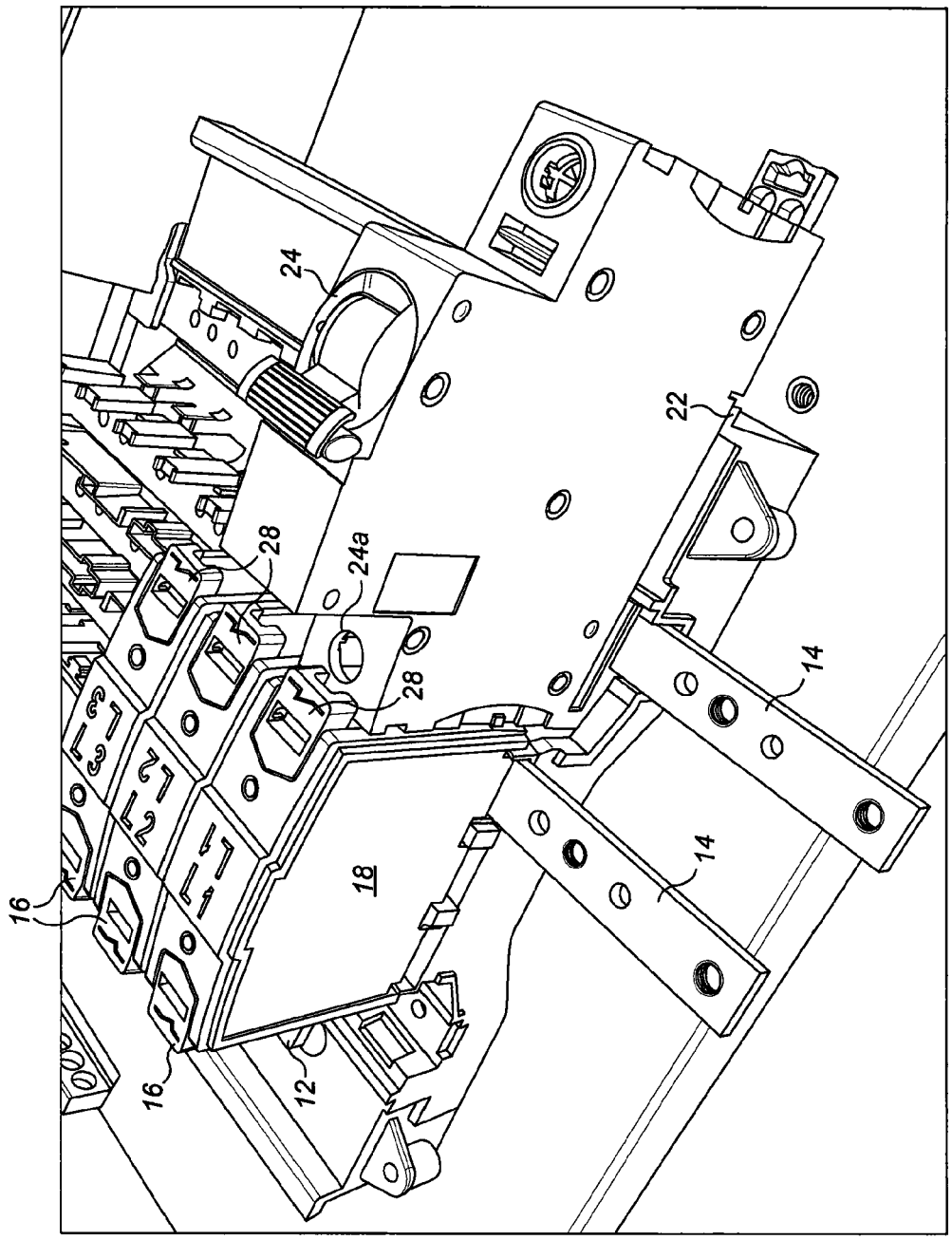
FIG. 11 is a perspective view of FIG. 10.

The operation of the electrical distribution board 10 will now be described with reference to FIGS. 10 to 13. FIG. 10 illustrates the circuit breaker 24 being attached to the electrical distribution board 10. In this position the isolation mechanism 16 is in the first position ("Off", "0") and the engagement portions 34, 36 are in engagement with one another. In order to fit the circuit breaker 24 to the electrical distribution board 10 it must be attached to the outgoing component mounting rail 22 and the outgoing conductor terminal 12 being connected to a circuit breaker connection point 24a, in the usual manner. As illustrated, the circuit breaker 24 is initially positioned just under the lower surface 28d of the planar member 28 of the isolation mechanism 16 and, as the circuit breaker 24 connects and pivots with respect to the rail 22 as it is pushed downwards, the planar member 28 deforms with respect to the body portion 26. That is, the planar member 28 is pushed upwards slightly as the circuit breaker 24 is connected to the rail 22. As the planar member 28 is pushed upwards the engagement portions 34, 36 of the planar member 28 and housing 18 partially disengage from one another. As described above, this disengagement of the isolation mechanism 16 from the housing 18 is as a result of the resilience of the planar member 28. The attached circuit breaker 24 is illustrated in FIG. 11. It should be appreciated that in this state the isolation mechanism 16 is fully engaged with the housing 18. That is, operation of the isolation mechanism 16 is prohibited, as the engagement portions 34, 36 of the planar member 28 and housing 18 are engaged with one another.

Figure 12:
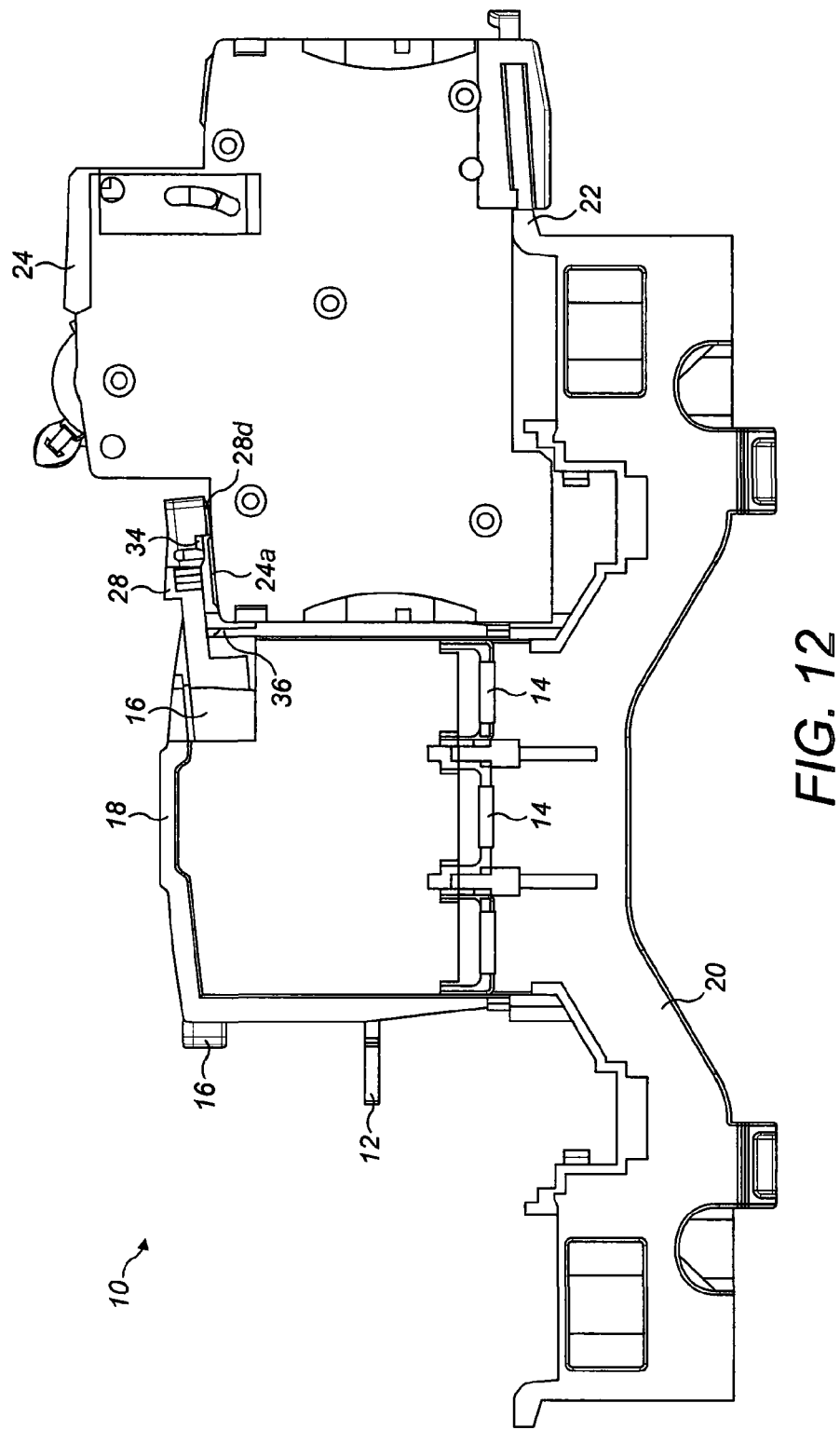
FIG. 12 is a side view of the electrical distribution board after the circuit breaker has been attached and the isolation mechanism has been moved to the second position.
Figure 13:
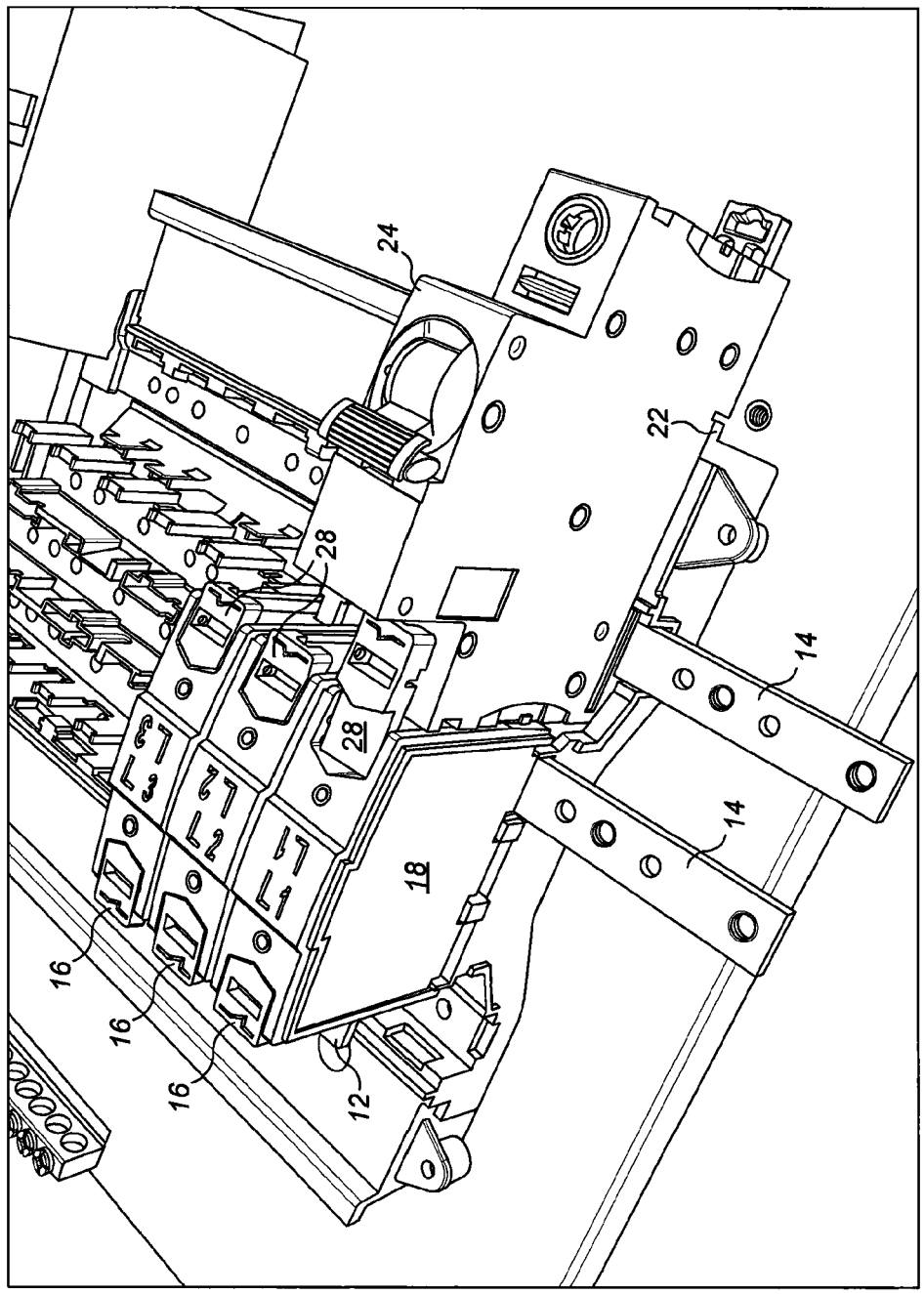
FIG. 13 is a perspective view of FIG. 12.

FIGS. 12 and 13, illustrate the isolation mechanism 16 in the second position ("On", "I"). Here it can be seen that the planar member 28 has been pulled upwards, such that the engagement portions 34, 36 of the planar member 28 and housing 18 are disengaged from one another, and pulled to the right, such that the isolation mechanism 16 is moved from the first position ("Off", "0") to the second position ("On", "I"), thus energising the outgoing conductor terminals 12. As described above, in order to disengage the planar member 28 from the housing 18, it is necessary to physically bend (i.e. lift) the planar member 28 upwards and away from the housing. This action brings the engagement portions 34, 36 out of engagement with one another and allows movement of the isolation mechanism 16 from the first position ("Off", "0") to the second position ("On", "I").

With reference to FIGS. 11 and 13, it should be noticed that the planar member 28 is of a sufficient length that, when in the second position ("On", "I"), the planar member 28 covers the circuit breaker connection point 24a. This prevents accidental disconnection of the circuit breaker 24 while the isolation mechanism 16 is in the second position ("On", "I").

In order to return the isolation mechanism 16 to the first position ("Off", "0"), the process described above is reversed. That is, the planar member 28 is lifted and pushed back into the housing 18. The chamfered portions 18d, 28c of the housing 18 and the planar member 28 facilitate the return of the isolation mechanism 16 to the first position ("Off", "0"). Note that, due to the chamfered portions 18d, 28c, it is not always necessary to lift the planar member 28 before pushing inwards.

The circuit breaker 24 can then be safely removed from the electrical distribution board 10 on the known manner.

The electrical distribution board 10 of the present invention reduces the risk of accidental electrocution by energising the outgoing conductor terminals. Providing an electrical distribution board 10 where the isolation mechanism 16 must firstly be disengaged from the housing 18 before operation reduces the chance of someone accidentally energising. The electrical distribution board 10 of the present invention also mitigates the use of additional locking components to prevent operation of the isolation mechanism.

Modifications and improvements may be made to the above without departing from the scope of the present invention. For example, it should be appreciated that the at least one isolation mechanism may also be configured to be engageable with a housing of the electrical distribution board when the at least one isolation mechanism is in the second position such that movement of the at least one isolation mechanism from the second position to the first position is only permitted once the at least one isolation mechanism has been disengaged from the housing of the electrical distribution board. In this arrangement the body portion 26 of the isolation mechanism 16 may include first and second engagement portions. The first and second engagement portions being substantially identical and the first engagement portion for maintaining the isolation mechanism in the first position and the second engagement portion for maintaining the isolation mechanism in the second position. The physical arrangement and operation of the second engagement portion may be substantially the same as that describe above with reference to the first engagement portion.

It should also be appreciated that the recessed portions and protruding portions of the engagement portions of the isolation mechanism and the housing may be reversed.

Furthermore, although the body portion of the isolation mechanism has been illustrated and described above as being resilient and the isolation mechanism may be disengaged from the housing of the electrical distribution board by at least partially deforming the body portion of the least one isolation mechanism, it should be appreciated that alternatively, or additionally, the body portion may be biased towards the engaged position with the housing. That is, the body portion may be held in engagement with the housing via a biasing mechanism when the isolation mechanism is in the first position. The body portion may be spring biased.

In the arrangement where the isolation mechanism is held in engagement with the housing in the first position solely via a biasing mechanism, the isolation mechanism is disengaged from the housing by applying a force in the opposite direction to the force applied by the biasing mechanism (e.g. against the biasing force of a biasing spring) to disengage the engagement portions of the body portion and the housing. Once the engagement portions of the body portion and the housing have been disengaged, the isolation mechanism can be moved to the second position in the manner described above. In this arrangement it should be appreciated that the body portion, in addition to being laterally moveable with respect to the housing, may be vertically translatable with respect to the housing. The vertical translation of the body portion allows the body portion to engage and disengage with the housing, depending on the specific arrangement of the engagement portions thereof. It should be appreciated that either the entire body portion (including the planar member), in addition to be laterally translatable, may be vertically translatable, or the planar member on its own may be vertically translatable and laterally translatable. In the arrangement where the planar member is both vertically translatable and laterally translatable, the body portion, to which the planar member is attached, may only be laterally translatable and the planar member may translate vertically, while still being attached, thereto. Alternatively, the planar member may be pivotably connected to the body portion and the planar member is biased into engagement with the housing. In this arrangement the planar member is brought out of engagement with the housing by applying a force against the direction of the biasing force (e.g. pushed downwards into the housing, or pulled upwards out of the housing). The planar member (and body portion) is then slid to the second position, as described above. Where the planar member is pivotably connected to the body portion, the pivot point may include a coil spring which biases the planar member into the engaged position with the housing. It should be appreciated that the isolation mechanism may be engaged with the housing in the first position by virtue of the arrangement of the body portion (and planar member) and engagement portions described above (i.e. disengaged by deformation of the body portion), or may be engaged with the housing in the first position by virtue of the biasing mechanism (i.e. disengaged by applying an opposite force to the biasing mechanism). It should also be appreciated that the isolation mechanism may include both engagement devices.

Where the isolation mechanism arrangement is in engagement with the housing in the first position by virtue of the arrangement of the body portion (and planar member) and engagement portions, the disengagement may be performed by hand or a toll (e.g. a screwdriver).

The above-described arrangements are also applicable when the isolation mechanism is in an engaged position with the housing in the second position.

Where the isolation mechanism includes, or comprises, is in engagement with the housing in the first position by virtue of the biasing mechanism, the disengagement may be performed by hand or a tool (e.g. a screwdriver). The isolation mechanism may include a tool receiving aperture to receive the tool and allow the opposing biasing force to be applied.

The invention claimed is:

1. An electrical distribution board comprising:
   at least one incoming conductor terminal;
   at least one outgoing conductor terminal;
   at least one longitudinal bus conductor connected to the at least one incoming conductor terminal;
   at least one lateral conductor tab connected to the at least one bus conductor for distributing electrical power from the at least one bus conductor to the at least one outgoing conductor terminal; and
   at least one isolation mechanism for electrically isolating the at least one outgoing conductor terminal from the at least one lateral conductor tab, the at least one isolation mechanism being moveable between a first position in which the at least one outgoing conductor terminal is electrically isolated from the at least one lateral conductor tab and a second position in which the at least one outgoing conductor terminal is electrically connected to the at least one lateral conductor tab; and
   wherein the at least one isolation mechanism is configured to be engageable with a housing of the electrical distribution board when the at least one isolation mechanism is in the first position, such that movement of the at least one isolation mechanism from the first position to the second position is only possible once the at least one isolation mechanism has been disengaged from the housing of the electrical distribution board.

2. The electrical distribution board according to claim 1, wherein the at least one isolation mechanism is also configured to be engageable with a housing of the electrical distribution board when the at least one isolation mechanism is in the second position such that movement of the at least one isolation mechanism from the second position to the first position is only permitted once the at least one isolation mechanism has been disengaged from the housing of the electrical distribution board.

3. The electrical distribution board according to claim 1, wherein the at least one isolation mechanism includes a body portion which houses an electrical connector for connecting the at least one outgoing conductor terminal to the at least one lateral conductor tab.

4. The electrical distribution board according to claim 3, wherein the electrical connector is arranged to move with the at least one isolation mechanism between the first and second positions.

5. The electrical distribution board according to claim 4, wherein, when the at least one isolation mechanism is in the first position, the electrical connector is in electrical contact with the at least one lateral conductor tab and out of electrical contact with the at least one outgoing conductor terminal, and when the at least one isolation mechanism is in the second position, the electrical connector is in electrical contact with both the at least one outgoing conductor terminal and the at least one lateral conductor tab.

6. The electrical distribution board according to claim 3, wherein the body portion of the at least one isolation mechanism includes a first engagement portion configured to engage with an at least partially complimentary shaped engagement portion of the housing of the electrical distribution board, the first engagement portion of the at least one isolation mechanism and the housing of the electrical distribution board being arranged such that the at least one isolation mechanism and the housing of the electrical distribution board are engageable with one another, such that movement of the at least one isolation mechanism from the first position to the second position is only possible once the at least one isolation mechanism has been disengaged from the housing of the electrical distribution board.

7. The electrical distribution board according to claim 3, wherein the body portion of the at least one isolation mechanism includes a second engagement portion configured to engage with an at least partially complimentary shaped engagement portion of the housing of the electrical distribution board, the second engagement portion of the at least one isolation mechanism and the housing of the electrical distribution board being arranged such that the at least one isolation mechanism and the housing of the electrical distribution board are engageable with one another, such that movement of the at least one isolation mechanism from the second position to the first position is only possible once the at least one isolation mechanism has been disengaged from the housing of the electrical distribution board.

8. The electrical distribution board according to claim 6, wherein one of the engagement portions of the body portion of the at least one isolation mechanism or the engagement portions of the housing of the electrical distribution board include one or more recessed portions and the other of the engagement portions of the body portion of the at least one isolation mechanism or the engagement portions of the housing of the electrical distribution board include one or more correspondingly shaped protruding portions.

9. The electrical distribution board according to claim 3, wherein at least part of the body portion of the at least one isolation mechanism is resilient.

10. The electrical distribution board according to claim 9, wherein the body portion of the at least one isolation mechanism is sufficiently resilient that, when the at least one isolation mechanism is engaged with the housing of the electrical distribution board in the first position, or the second position, the at least one isolation mechanism is disengaged from the housing of the electrical distribution board by at least partially deforming the body portion of the least one isolation mechanism.

11. The electrical distribution board according to claim 6, wherein the engagement portions of the body portion of the at least one isolation mechanism and the housing of the electrical distribution board include at least one chamfered portion positioned adjacent at least one side of each engagement portion.

12. The electrical distribution board according to claim 3, wherein the body portion of the at least one isolation mechanism includes a planar member, the planar member being formed integrally with the body portion and being configured to resiliently deform with respect to the body portion.

13. The electrical distribution board according to claim 12, wherein the planar member of the body portion includes the first and second engagement portions.

14. The electrical distribution board according to claim 3, wherein the body portion of the at least one isolation mechanism is arranged to cover at least a part of an upper surface of a circuit breaker when the at least one isolation mechanism is in the second position and the circuit breaker is attached to the outgoing component mounting rail.

\* \* \* \* \*